US011863567B2

(12) United States Patent
Peron

(10) Patent No.: US 11,863,567 B2
(45) Date of Patent: Jan. 2, 2024

(54) MANAGEMENT OF BOT DETECTION IN A CONTENT DELIVERY NETWORK

(71) Applicant: Fastly, Inc., San Francisco, CA (US)

(72) Inventor: Christian Peron, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 87 days.

(21) Appl. No.: 17/167,774

(22) Filed: Feb. 4, 2021

(65) Prior Publication Data

US 2021/0243205 A1 Aug. 5, 2021

(51) Int. Cl.
*H04L 67/568* (2022.01)
*H04L 9/40* (2022.01)
*H04L 67/5651* (2022.01)
*H04L 67/5683* (2022.01)

(52) U.S. Cl.
CPC .......... *H04L 63/1408* (2013.01); *H04L 63/10* (2013.01); *H04L 67/568* (2022.05); *H04L 67/5651* (2022.05); *H04L 67/5683* (2022.05); *H04L 2463/144* (2013.01)

(58) Field of Classification Search
CPC ... H04L 63/1408; H04L 63/568; H04L 63/10; H04L 2463/144; H04L 67/5651; H04L 67/5683; H04L 67/60
USPC .......................... 709/220, 224, 225, 227, 228
See application file for complete search history.

(56) References Cited

U.S. PATENT DOCUMENTS

| 9,749,356 | B2* | 8/2017 | Bailey | G06F 21/602 |
|---|---|---|---|---|
| 9,800,601 | B2* | 10/2017 | Bailey | H04L 63/1408 |
| 10,798,096 | B2* | 10/2020 | Touati | H04L 63/0853 |
| 10,805,328 | B2* | 10/2020 | Bailey | H04L 67/303 |
| 11,295,722 | B2* | 4/2022 | Edwards | G10L 15/07 |
| 11,343,458 | B2* | 5/2022 | Sugawa | H04N 25/771 |
| 11,718,561 | B2* | 8/2023 | Yancey | C04B 18/146 106/737 |
| 2016/0344769 | A1* | 11/2016 | Li | H04L 63/0876 |
| 2017/0180380 | A1* | 6/2017 | Bagasra | H04L 63/101 |
| 2018/0191762 | A1* | 7/2018 | Bailey | G06F 21/602 |
| 2018/0211554 | A1* | 7/2018 | Corbin, II | G06F 18/29 |
| 2018/0307555 | A1* | 10/2018 | Zwart | H04L 1/0061 |
| 2019/0028492 | A1* | 1/2019 | Coleman | G08B 21/182 |
| 2021/0037408 | A1* | 2/2021 | Vagelos | H04B 17/27 |
| 2021/0337009 | A1* | 10/2021 | Spång | H04L 67/564 |

FOREIGN PATENT DOCUMENTS

EP 3557843 A1 * 10/2019 .......... G06F 21/552

* cited by examiner

Primary Examiner — Khanh Q Dinh

(57) ABSTRACT

Disclosed herein are systems, methods, and software for managing bot detection in a content delivery network (CDN). In one implementation, a cache node in a CDN may obtain a content request without a valid token for content not cached on the cache node and, in response to the content request, generate a synthetic response for the content request, wherein the synthetic response comprises a request for additional information from the end user device associated with the content request. The cache node further may obtain a response from the end user device and determine whether to satisfy the request based on whether the response from the end user device indicates that it is a bot.

18 Claims, 6 Drawing Sheets

US 11,863,567 B2

MANAGEMENT OF BOT DETECTION IN A CONTENT DELIVERY NETWORK

RELATED APPLICATIONS

This application is related to and claims the benefit of priority to U.S. Provisional Patent Application 62/969,871 entitled MANAGEMENT OF BOT DETECTION IN A CONTENT DELIVERY NETWORK, filed on Feb. 4, 2020 which is hereby incorporated by reference in its entirety.

BACKGROUND

Content delivery networks have evolved to provide more than just caching content at the edge. Rather, many content delivery networks now provide distributed denial of service (DDoS) protection, security shields, load balancing, video streaming, content optimization, and other services on behalf of their customers. These operations permit customers to use a single service provider, the content delivery network, to support the various functions associated with providing required content to end user devices In some implementations, a customer may deploy a content delivery network to limit the number of incoming connections to origin servers supported by the customer. In particular, rather than servicing each content request from a single origin server, a customer of a content delivery network may cache the content on cache nodes of the content delivery network. As a result, only when new or updated content is required, will a content request be communicated back to the origin server.

However, while it is desirable to obtain content from an origin server when a valid request is communicated from an end user device, a customer may desire to block requests to the origin that correspond to suspicious or robotic (bot) requests. These requests, which can originate from automated browsers and systems can be used to scrape web services, implement DDoS operations on origin servers, or provide some other malicious operation in association with the customer.

OVERVIEW

Technology is disclosed herein for managing bot detection in content delivery networks (CDNs). In one implementation, a cache node in a CDN identifies a content request without a valid token for content not cached on the cache node. In response to the content request, the cache node generates a synthetic response for the content request, wherein the synthetic response includes at least a request for a proof of work and fingerprinting attributes associated with an end user device that generated the content request. The cache node further obtains a response from the end user device to the synthetic response and determines whether the content request is associated with a bot based on the response. If the content request is associated with a bot, then the content request is denied. If the content request is not associated with a bot, then the content is obtained from an origin server and provided to the requesting end user device.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Technology is disclosed herein for managing bot detection in a content delivery network. In a highly simplified example, a content delivery network serves as an intermediary between end users and customer origins. A typical server or cache node in a content delivery network (CDN) receives requests for content from end-user applications and web browsers. A layer of software on the server that is managed by the network operator serves the content to the end-user from its cache or retrieves the content from a customer origin server or servers if the content is not in the cache or is stale. This layer of software may comprise a Varnish Configuration Language (VCL) service, an Apache Traffic Server service, or some other Hypertext Transfer Protocol (HTTP) acceleration service.

In some implementations, a customer may desire to limit the number of requests that are forwarded to the one or more origin servers, as the requests may increase the amount of resources required to employ the one or more origin servers. These resources may comprise processing resources, network interface resources or other similar connectivity resources, or some other similar resource. To limit the number of requests that are provided to the one or more origin servers, the CDN may employ tokens that can be used to verify end user devices that are requesting content. In at least one implementation, information about the end user device is provided to a cache node in the CDN, the CDN then generates a unique encrypted token and provides the token to the requesting end user device. Once provided, the end user device may use the token to request and obtain content from the cache node.

Here, in managing the access to the tokens, the CDN may attempt to prevent bots, or autonomous networked programs, from receiving tokens and obtaining content that is stored on the origin servers. These bots may be used to scrape information from customer sites, perform denial of service operations, or provide some other similar operation with respect to a customer of the CDN. In preventing access to content for the bots, a cache node may determine when a content request is generated without a valid token and that the request corresponds to content not cached at the cache node. In response to the content request, the cache node may generate a synthetic response to the content request that is used in gathering additional information about the requesting device. Based on the information supplied by the requesting device, the cache node may determine whether the device is a bot and handle the content request based on the determination. In particular, if the cache node determines that the content request is associated with a bot, then the cache node may prevent the request from being forwarded to the origin server, preserving resources for the origin server.

Figure 1:
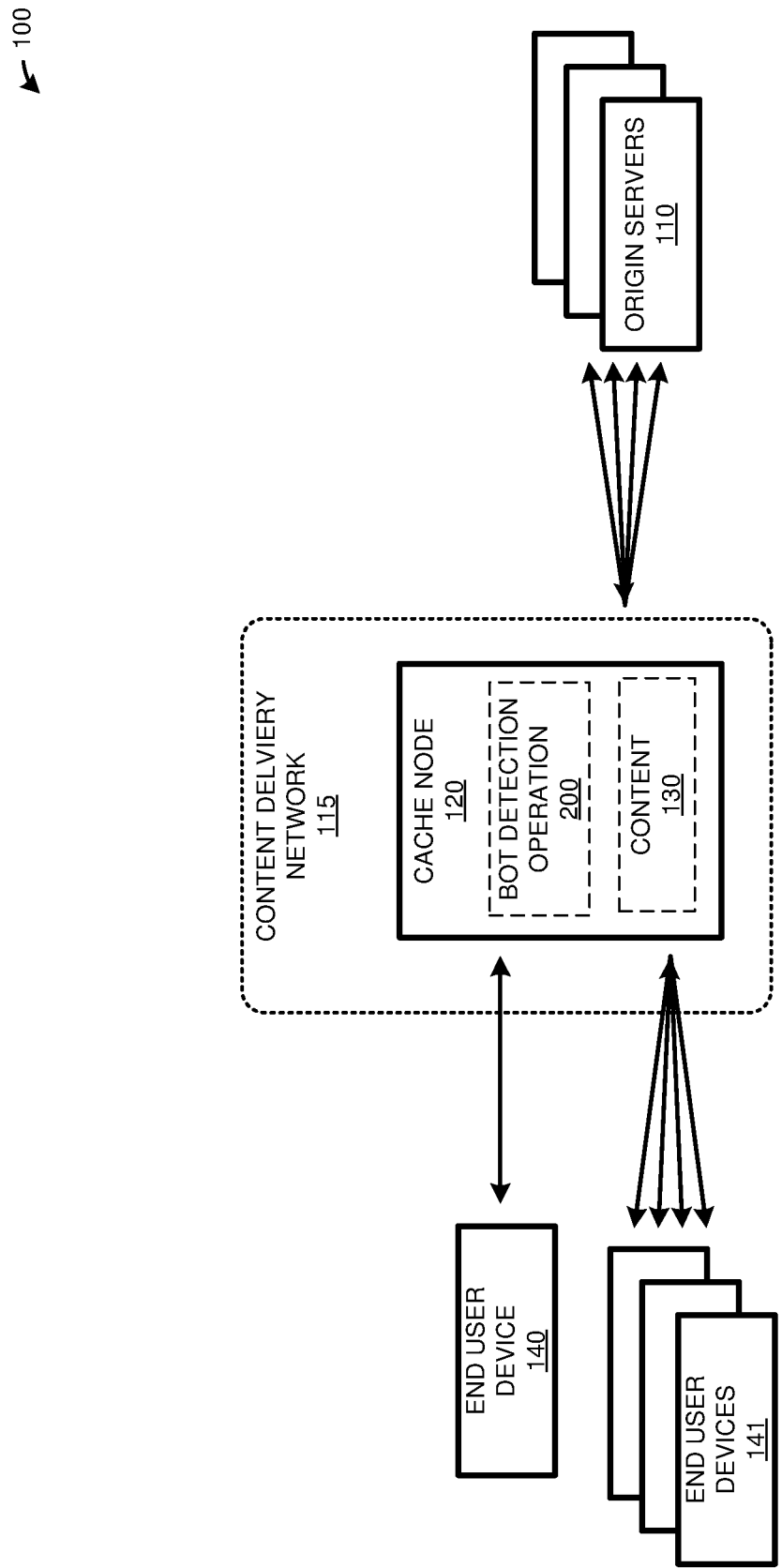
FIG. 1 illustrates a computing network to manage bot detection for content requests according to an implementation.

FIG. 1 illustrates a computing network 100 to manage bot detection for content requests according to an implementation. Computing network 100 incudes origin servers 110, CDN 115, and end user devices 140-141. CDN 115 further includes cache node 120 that stores content 130 and provides bot detection operation 200 that is further described below in FIG. 2. Although demonstrated with a single cache node, it should be understood that CDN 115 may include any number of cache nodes in various geographical locations to supply content to requesting users.

In operation, cache node 120 caches content 130 to support content requests from end user devices 140-141. In particular, rather than routing content requests to origin servers 110 that are supported by customers of CDN 115, a domain name service may be used to direct the content requests to a cache node in CDN 115. In some implementations, responsive to a request from an end user device, such as end user device 140, cache node 120 may execute a VCL service, an Apache Traffic Server service, or some other HTTP acceleration service to determine how to respond to the request. The HTTP acceleration service may determine whether the content associated with the request is cached in content 130, determine whether the end user device supplied a required token to access the content, or provide some other operation with respect to the content request. In some examples, when the content request is not cached n content 130, cache node 120 may generate a second request to an origin server of origin servers 110 to obtain the required content. Once obtained, cache node 120 may provide the content to the requesting end user device, generate a token and provide the token to the end user device, and, in some examples, cache the obtained content in content 130.

Here, cache node 120 includes bot detection operation 200 that is used to detect bots that request content from cache node 120. Bot detection operation 200 is representative of a process written in VCL, python, or some other programming language, including combinations thereof, that is capable of identifying content requests without a token and determining whether the request is associated with a bona fide end user device. When the content request is determined to not be associated with a bot, cache node 120 may obtain and provide the requested content. However, when the content request is determined to be associated with a bot, cache node 120 may block or prevent the requested content from being provided to the end user device.

Figure 2:
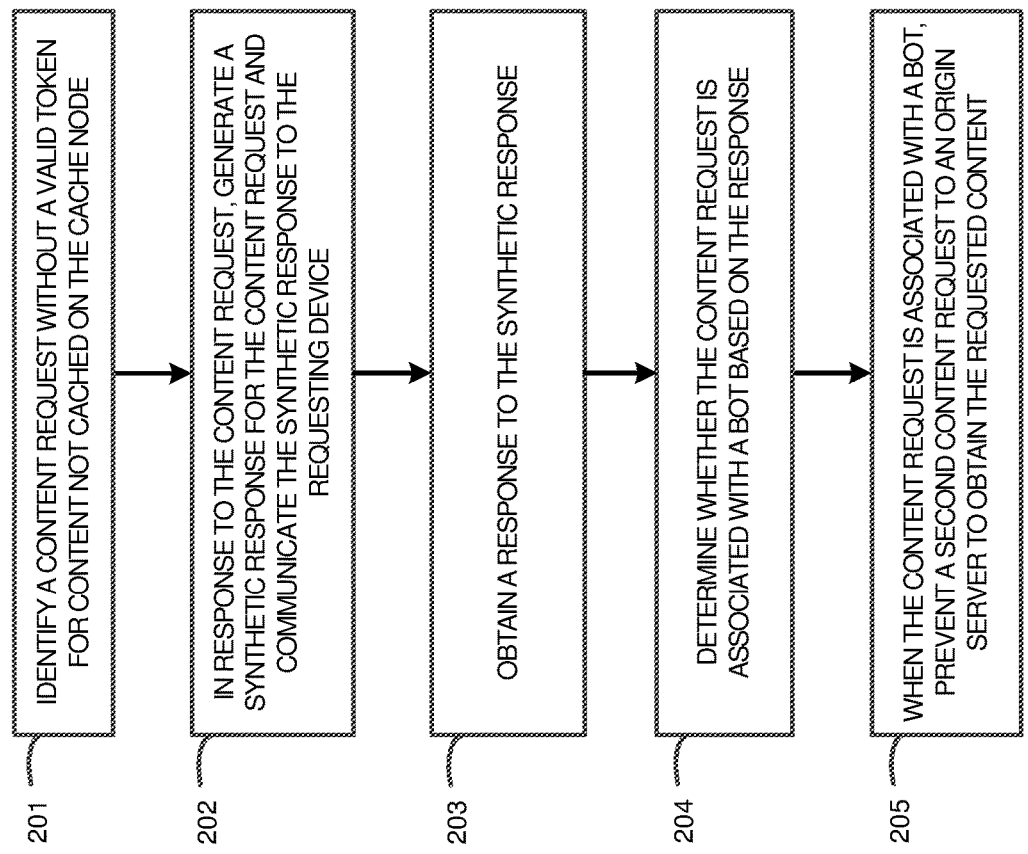
FIG. 2 illustrates an operation of a cache node to manage bot detection for content requests according to an implementation.

FIG. 2 illustrates an operation 200 of a cache node to manage bot detection for content requests according to an implementation. The steps of operation 200 are referenced parenthetically in the paragraphs that follow with reference to systems and elements of computing network 100 of FIG. 1.

As depicted, operation 200 includes identifying (201) a content request without a valid token for content not cached on the cache node. For example, end user device 140 may generate a content request that is directed to cache node 120, wherein the request corresponds to content not stored in content 130. In response to the content request, operation 200 further generates (202) a synthetic response for the content request, wherein the synthetic response includes at least a request for a proof of work and fingerprinting attributes associated with an end user device that generated the content request. The first portion of the synthetic response comprises a proof of work, which may include a hash request for the requesting end user device. In some examples, cache node 120 may provide data to the end user device and require the end user device to generate a nonce, which is a number added to the data to generate a particular hashed value. For example, cache node 120 may provide data to the end user device and require the data to generate a 4-bit hash value by adding a nonce to the value. Here, the nonce value is considered the proof of work. In some examples, the proof of work may comprise a Java script proof of work function, but it should be understood that any proof of work function capable of being provided by a browser may be requested by cache node 120. In some examples, requesting devices that are bots may not include the required functionality to be able to solve the proof of work function and provide the proper value to the cache node.

In addition to providing the request for the proof of work, the synthetic response will also request fingerprinting attributes for the requesting end user device. These attributes may include a browser version associated with the requesting device, an operating system version associated with the requesting device, an internet protocol (IP) address associated with the requesting device, or some other information or attribute associated with the requesting device.

Once the synthetic response is communicated to the end user device, cache node 120 obtains (203) a response from the end user device to the synthetic response. This response may include one or more values associated with the proof of work and may further include fingerprinting attributes provided by the end user device. After receiving the response, cache node 120 may determine (204) whether the content request is associated with a bot based on the response. In some implementations, cache node 120 may use one or more services, wherein the services may comprise local or external databases capable of identifying bots based on the attributes. For example, cache node 120 may use a first service to determine whether the IP address associated with the content request has been identified as malicious or associated with a bot. The service may obtain this information from content providers, CDNs, or from some other source. The one or more services may provide an indication to operation 200 indicating whether the content request could be associated with a bot and based on the indications from the one or more services, cache node 120 may determine whether the content request should be satisfied. In some implementations, based on the information from the services, cache node 120 may generate a score that indicates the likelihood that the content request is associated with a bot, wherein the score may comprise a numerical value, a letter grade, or some other value (or in some cases values) based on the information from the one or more services. The score may then be compared against one or more criteria to determine whether the content request is associated with a bot. In some examples, the criteria for determining a bot may be defined by a customer of the CDN, wherein the customer may define a score or other indications to define a bot. In other examples, the CDN may define the criteria for determining a bot.

In some implementations, in determining whether the content request is associated with a bot, cache node 120 may first determine whether the end user device is capable of solving the proof of work request. If the end user device is incapable of solving the request, then cache node 120 may identify that the end user device is a bot. However, if the end user device is capable of solving the proof of work request, then cache node 120 may consider the fingerprinting attributes associated with the end user device to make the final determination on whether the content request is valid.

Once it is determination is made that the content request is associated with a bot, cache node 120 may prevent (205) a second content request to an origin server to obtain the requested content. For example, if a content request from end user device 140 is determined to be associated with a bot, cache node 120 may prevent the retrieval of content from at least one origin server of origin servers 110 to obtain the requested data. However, if a determination is made that indicates that the content request is not associated with a bot, cache node 120 may obtain the required content from at least one origin server of origin servers 110 and provide the requested content to end user device 140. In some examples, cache node 120 may further provide a token to end user device 140, permitting end user device 140 to request additional content without the use of a synthetic response as described above. Additionally, in some examples, cache node 120 may cache the content received from the one or more origin servers based on a caching configuration associated with the customer and/or CDN 115.

Figure 3:
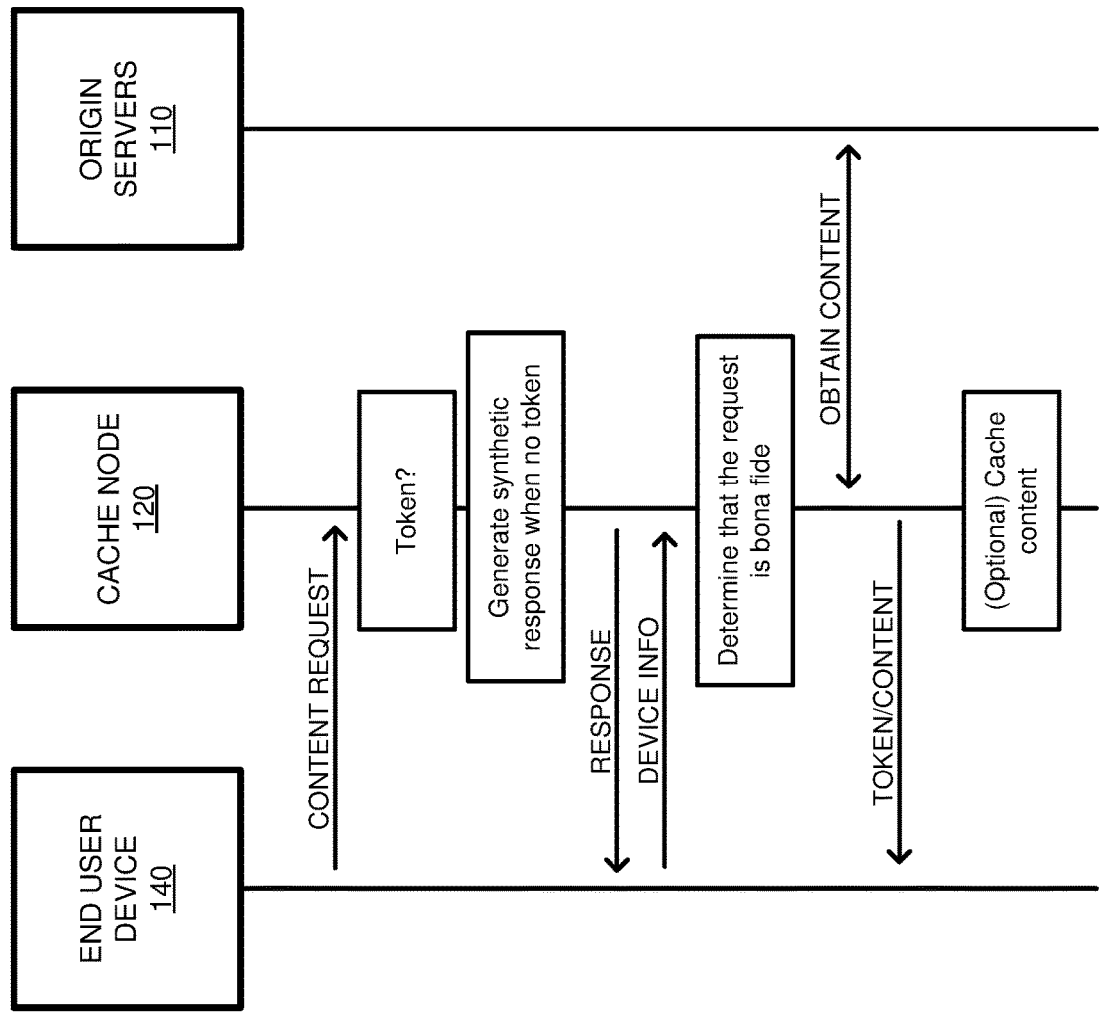
FIG. 3 illustrates a timing diagram for identifying bona fide content request according to an implementation.

FIG. 3 illustrates a timing diagram 300 for identifying bona fide content request according to an implementation. Timing diagram 300 includes end user device 140, cache node 120, and origin servers 110 from computing network 100 of FIG. 1.

As depicted, end user device 140 may generate a content request that is received by cache node 120, wherein the content request may be generated by a web browser, a web connected application, or some other process on end user device 140. In response to the content request, cache node 120 determines whether a token is present in the content request. When a token is present, cache node 120 may identify the requested content and provide the requested content to end user device 140. When a token is not present, cache node 120 may determine whether the request corresponds to content that is not cached at cache node 120 and, when the request corresponds to content that is not cached on cache node 120, generate a synthetic response, wherein the synthetic response requests additional information from end user device 140. The additional information may include a proof of work and fingerprinting attributes associated with end user device 140. In some implementations, the proof of work may include a Java Script proof of work function or some other hashing function for the end user device. The end user device may be responsible for obtaining the proof of work problem the cache node and developing a nonce that solves the problem. Additionally, the fingerprinting attributes may include information about the end user device and the browser or application generating the request, wherein the attributes may include a version associated with the browser, a version associated with the operating system for the end user device, IP or other similar addressing associated with the end user device, or some other information associated with the end user device.

When the synthetic response is provided to end user device 140, end user device may determine the required device information and provide the information back to cache node 120. Cache node 120 may then use the supplied information from end user device to determine that end user device 140 is representative of a bona find content requester. In some implementations, cache node 120 may first determine whether end user device 140 is capable of solving the proof of work request. If end user device 140 is incapable of solving the proof of work request, then cache node 120 may identify that the end user device is associated with a bot and may deny the content request. In contrast, if end user device 140 provides the correct solution to the proof of work request, cache node 120 may determine whether the attributes provided by the device satisfy criteria indicating that the device is not a bot. In some implementations, cache node 120 may use one or more services, which may comprise databases, that are capable of associating one or more attributes provided by the end user device with an indication of whether the device comprises a bot. For example, cache service may communicate an operating system version and a browser version to a service provided by the CDN or an external organization. The service may then use one or more data structures to determine whether the requesting end user device is associated with a bot and provide a notification to cache node 120 indicating the bot status for end user device. In at least one example, the information from the various services may be used to generate a score indicating a likelihood that the device is associated with a bot. When the score satisfies criteria, cache node 120 may determine that the request is associated with a bot.

Here, cache node 120 determines that the end user device 140 is associated with a bona fide request for content and obtains the required content from origin servers 110. Once obtained, cache node 120 may provide the content and, in some examples, a token to support future content requests from end user device 140. Additionally, cache node 120 may cache the content based on the configuration of the cache node, wherein caching the content may permit the content to be provided to other requesting devices.

Figure 4:
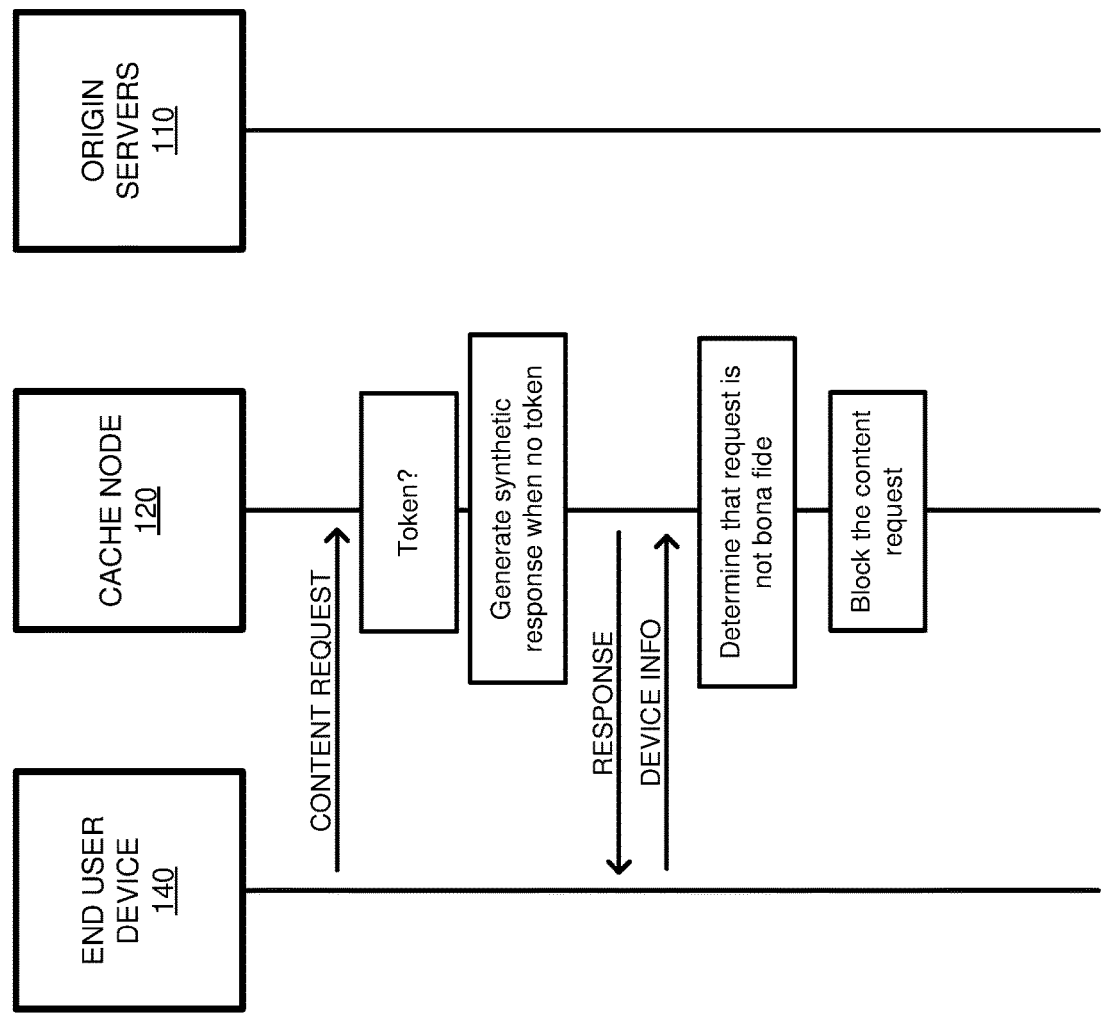
FIG. 4 illustrates a timing diagram for identifying a content request from a bot according to an implementation.

FIG. 4 illustrates a timing diagram 400 for identifying a content request from a bot according to an implementation Timing diagram 400 includes end user device 140, cache node 120, and origin servers 110 from computing network 100 of FIG. 1.

As depicted, end user device 140 may generate a content request that is received by cache node 120, wherein the content request may be generated by a web browser, a web connected application, or some other process on end user device 140. In response to the content request, cache node 120 determines whether a token is present in the content request. When a token is present, cache node 120 may identify the requested content and provide the requested content to end user device 140. When a token is not present, cache node 120 may determine whether the request corresponds to content that is not cached at cache node 120 and, when the request corresponds to content that is not cached on cache node 120, generate a synthetic response, wherein the synthetic response requests additional information from end user device 140. The additional information may include a proof of work and fingerprinting attributes associated with end user device 140. In some implementations, the proof of work may include a Java Script proof of work function or some other hashing function for the end user device. The end user device may be responsible for obtaining the proof of work problem the cache node and developing a nonce that solves the problem. Additionally, the fingerprinting attributes may include information about the end user device and the browser or application generating the request, wherein the attributes may include a version associated with the browser, a version associated with the operating system for the end user device, IP or other similar addressing associated with the end user device, or some other information associated with the end user device.

When the synthetic response is provided to end user device 140, end user device may determine the required device information and provide the information back to cache node 120. Cache node 120 may then use the supplied information from end user device to determine that end user device 140 is representative of a bona find content requester. In some implementations, cache node 120 may first determine whether end user device 140 is capable of solving the proof of work request. If end user device 140 is incapable of solving the proof of work request, then cache node 120 may identify that the end user device is associated with a bot and may deny the content request. In contrast, if end user device 140 provides the correct solution to the proof of work request, cache node 120 may determine whether the attributes provided by the device satisfy criteria indicating that the device is not a bot. In some implementations, cache node 120 may use one or more services, which may comprise databases, that are capable of associating one or more attributes provided by the end user device with an indication of whether the device comprises a bot. For example, cache service may communicate an operating system version and a browser version to a service provided by the CDN or an external organization. The service may then use one or more data structures to determine whether the requesting end user device is associated with a bot and provide a notification to cache node 120 indicating the bot status for end user device. In at least one example, the information from the various services may be used to generate a score indicating a likelihood that the device is associated with a bot. When the score satisfies criteria, cache node 120 may determine that the request is associated with a bot.

Here, cache node 120 determines that the content request from end user device 140 should be blocked. This blocking may be based on the ability for end user device 140 to solve the proof of work request, the fingerprinting attributes provided by end user device 140, or some other information provided by end user device 140, including combinations thereof. For example, end user device may provide an IP address and a browser version that is associated with a bot. The one or more services consulted by cache node 120 may indicate that likelihood of a bot and cache node 120 may block the request from being satisfied. Additionally, cache node 120 may maintain information associated with the requests that were blocked and may use the information to block future requests, provide information to an administrator associated with the SDN or content provider, or provide some other operation.

In some implementations, an administrator of the CDN or the customer of the CDN may configure or define criteria to classify content requests as associated with a bot. These criteria may permit various combinations of services that are capable of indicating a content request is associated with a bot. For example, a customer may indicate that if the IP address and browser version are associated with a possible bot, then the content request should be treated as a bot. Further, in some examples, the CDN or customer may provide preferences that indicate different actions to take based on different fingerprinting attributes obtained from an end user device. For example, a first preference may indicate that content requests associated with an IP address for a bot should be blocked, whereas content requests associated with a potential bot browser may be directed to the origin server and have a log entry created for the potential bot related request.

Although demonstrated in the previous examples as using bot detection in association with content requests to the origin servers, it should be understood that a CDN may use bot detection to prevent providing content cached in the various cache nodes. In particular, when a request is obtained that does not include a valid token, cache node 120 may determine whether the content request is associated with a bot. When the request is associated with a bot, the cache node may block the content request, whereas when the request is not associated with the bot, the cache node may provide the requested content with a token for future requests.

Figure 5:
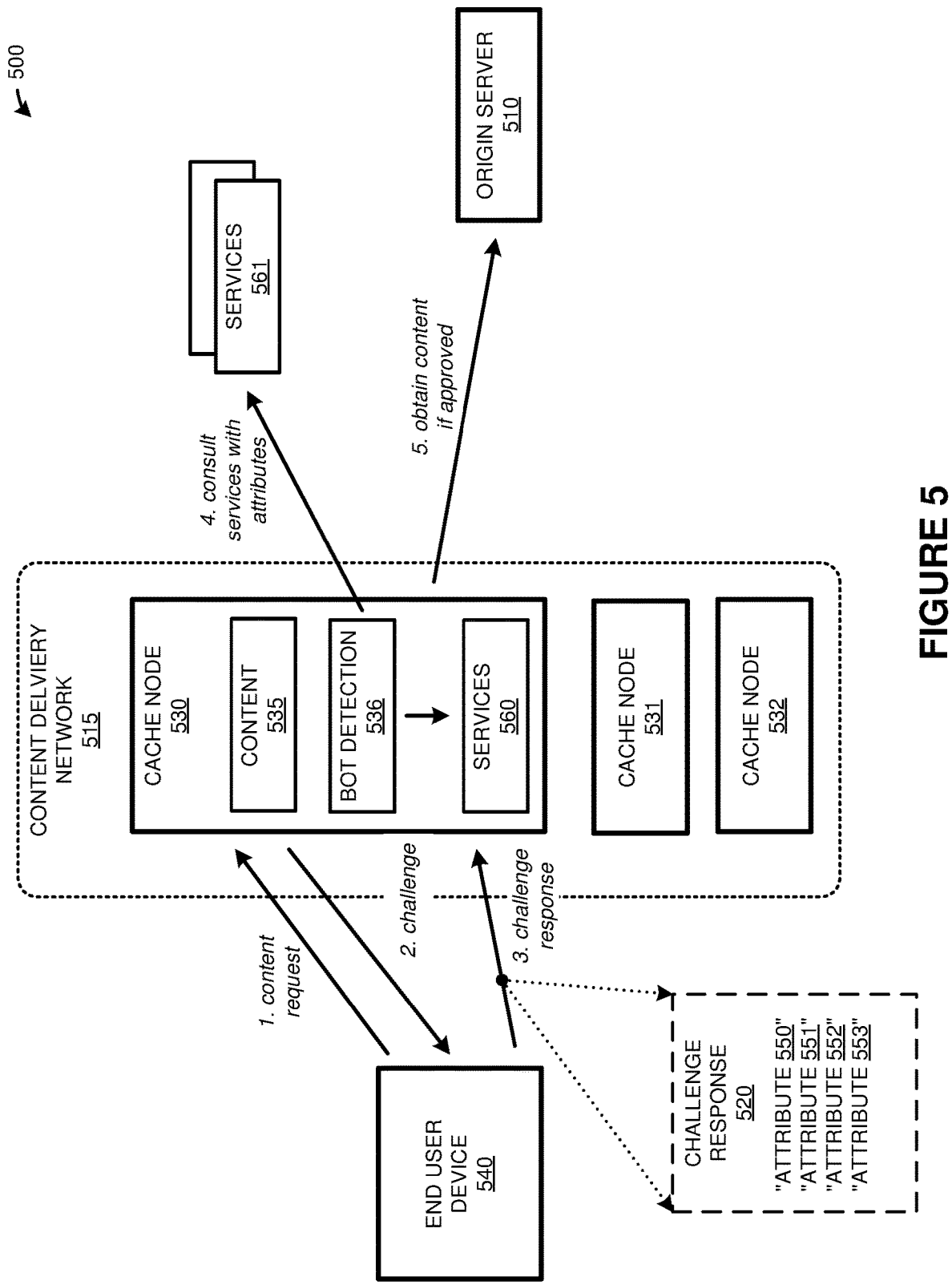
FIG. 5 illustrates an operational scenario of identifying content requests associated with bots according to an implementation.

FIG. 5 illustrates an operational scenario 500 of identifying content requests associated with bots according to an implementation. Operational scenario 500 includes end user device 540, CDN 515, and origin server 510. CDN 515 further includes cache nodes 530-532, wherein cache node 530 includes content 535 and bot detection 536 that consults with services 560-561.

In operation, end user device 540 generates, at step 1, a content request that is directed to cache node 530. In response to the content request, cache node 530 may determine whether the request is for content in content 535 and whether the content request includes a token provided as part of a previous content request. A token may be generated and provided for all content cached by cache node 530, for content specific to a particular customer, or for some other division of the content supported by cache node 530. When it is determined that the request does not include the required token and the request is for content not cached as part of content 535, cache node 530 generates, at step 2, a challenge to end user device 540 that is provided as a synthetic response to the content request.

After providing the synthetic response to end user device 540 as a synthetic response to the content request, end user device 540 may generate, at step 3, challenge response 520 that includes attributes 550-553. Attributes 550-553 may include fingerprinting attributes that provide information about end user device 540 and may further include a response to the proof of work request provided by cache node 530. In particular, bot detection 536 may generate the synthetic response that can include a proof of work and a request for fingerprinting attributes from the requesting device. Once the response is obtained, bot detection 536 may consult, at step 4, with services 560 to determine whether challenge response 520 indicates that end user device 540 is not a bot.

In some implementations, services 560-561 may include databases provided by CDN 515 and external services that can execute on servers outside of CDN 515. In some examples, services 560 may represent services that are subscribed to by the customer of the CDN (bot detection 536 may be a subscribed service in some examples as well). When a content request is received by cache node 530, cache node 530 may determine the services or other applications that are available to the customer to support the request. For example, bot detection 536 and services 560 may each operate as a container, a virtual machine, or some other containerized endpoint. When the content request is obtained from end user device 540, cache node 530 may determine that a bot detection operation is available for the requested content and initiate bot detection 536 to determine whether the request corresponds to a bot. In executing bot detection 536, bot detection 536 may use resources allocated to the customer and provided by services 560 to determine whether specific attributes of attributes 550-553 correspond to a possible bot. For example, attribute 550 may correspond to an IP address associated with end user device 540, and a service of services 560 may maintain information about malicious IP addresses identified from other content requests or reports from other content providers. Accordingly, the response from the service may provide an indication of whether attribute 550 corresponds to a possible bot. Based on the information from the services, cache node 530 may determine whether the content request satisfies criteria associated with being a bot. The criteria may include any service indicating that the request is a bot, a combination of services indicating that the request is a bot, a score generated from the attributes and the service indications, or some other criteria. The criteria may be defined by the CDN or may be provided by the customer of the CDN.

After determining that the content request is not associated with a bot, cache node 530 obtains, step 5, the content from origin server 510 and forwards the content to end user device 540. The content may comprise video data, imaging data, text data, or some other content for end user device 540. In some implementations, the customer may provide preferences for how content requests are handled that are associated with a bot. These preferences may indicate criteria for when content can be obtained from origin server 510, when content requests should be blocked, when a token should be provided to a requesting end user device, when a log entry should be generated for the content request for further analysis, or some other preference. For example, when first attributes are present, cache node 530 may supply the requested content to an end user device and generate a log entry for further analysis, however, when second attributes are present, cache node 530 may block the content to the end user device.

In at least one implementation, each of the customers may select the different applications, such as bot detection 536 and the various services from an application repository. Once selected, CDN 515 may permit content requests to support the use of each of the selected applications, wherein the applications may be executed as containerized endpoints.

Figure 6:
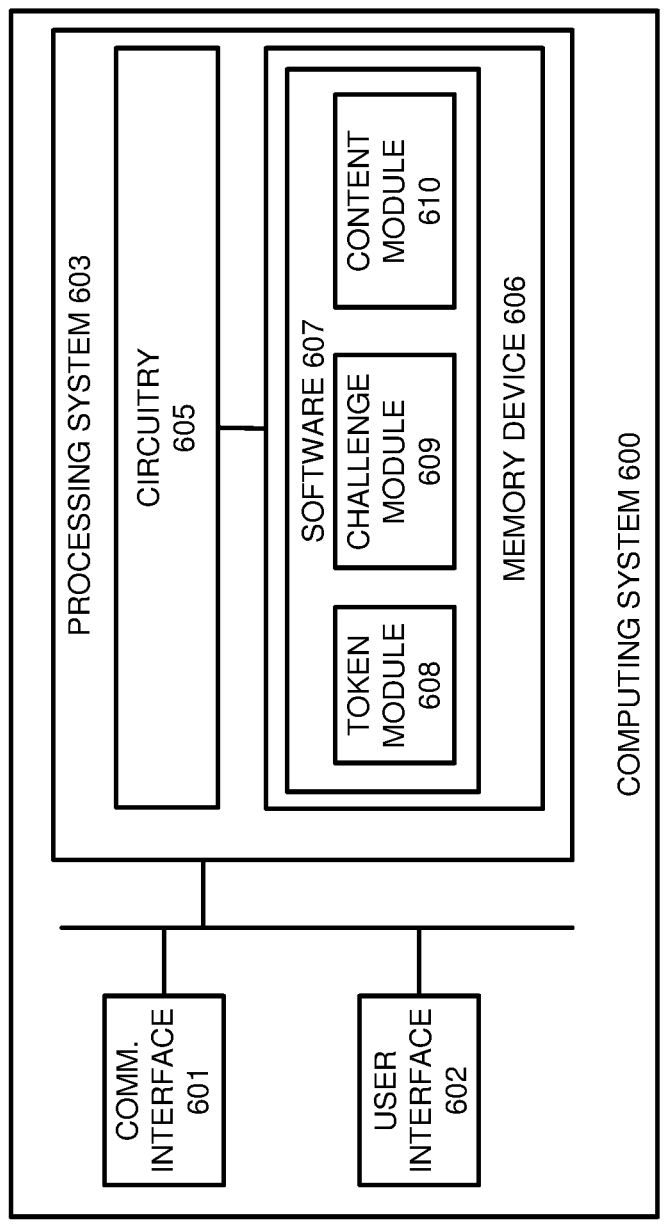
FIG. 6 illustrates a cache node computing system in a content delivery network according to an implementation.

FIG. 6 illustrates a cache node computing system 600 in a CDN according to an implementation. Computing system 600 is representative of any computing system or systems with which the various operational architectures, processes, scenarios, and sequences disclosed herein for a management system may be implemented. Computing system 600 is an example of cache node 120 of FIG. 1, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity. Computing system 600 may comprise one or more server computing systems, desktop computing systems, laptop computing systems, or any other computing system, including combinations thereof.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 is configured to communicate with end user devices, origin servers, and management systems of a CDN in some examples.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes token module 608, challenge module 609, and content module 610, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein.

In at least one implementation, token module 608 directs processing system 603 to obtain a request from an end user device. The token module may then determine whether the request is without a valid token and whether the content is for content not cached by computing system 600. If the content is not cached and no token is included with the response, challenge module 609 directs processing system 603 to generate a second synthetic response for the content request, wherein the second synthetic response includes at least a request for a proof of work and fingerprinting attributes associated with a second end user device that generated the second content request.

Once the synthetic response is communicated to the requesting device, challenge module 608 may obtain a response from the end user device to the synthetic response and determine whether the content request is associated with a bot. If not associated with a bot, then content module 610 may obtain the requested content and provide the content to the requesting device along with a new token in some examples. In contrast, if the request is associated with a bot, based on criteria, scores, or some other element, content module 610 may block the request, generate a log for the request, or provide some other operation that prevents access to the requested content.

In at least one implementation, administrators associated with the customer for the content may provide preferences for how content requests are processed. In particular, the customer may define criteria that is used to determine what requests are blocked, permitted, logged, or performed some other operation. Further, although described in the previous examples using requests that are forwarded to the origin servers, similar operations may be applied to requests for content cached at computing system 600.

Returning to the elements of FIG. 1, cache node 120 and origin servers 110 can each include communication interfaces, network interfaces, processing systems, computer systems, microprocessors, storage systems, storage media, or some other processing devices or software systems, and can be distributed among multiple devices. Examples of cache node 120 and origin servers 110 can include software such as an operating system, logs, databases, utilities, drivers, caching software, networking software, and other software stored on a computer-readable medium. Cache node 120 and origin servers 110 may each comprise, in some examples, one or more server computing systems, desktop computing systems, laptop computing systems, or any other computing system, including combinations thereof.

User devices 140-141 can each be a user device, subscriber equipment, customer equipment, access terminal, smartphone, personal digital assistant (PDA), computer, tablet computing device, e-book, Internet appliance, media player, game console, or some other user communication apparatus, including combinations thereof. User devices 140-141 can each include communication interfaces, network interfaces, processing systems, computer systems, microprocessors, storage systems, storage media, or some other processing devices or software systems. In some implementations, an end user device may comprise a virtual machine, container, or some other containerized bot platform.

Communication links between the elements of computing network 100 can use metal, glass, optical, air, space, or some other material as the transport media. The communication links can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. The communication links can each be a direct link or can include intermediate networks, systems, or devices, and can include a logical network link transported over multiple physical links. Although one main link is illustrated between end user devices 140-141 and cache node 120 and between cache node 120 and origin servers 110, it should be understood that the links are merely illustrative to show communication modes or access pathways. In other examples, further links can be shown, with portions of the further links shared and used for different communication sessions or different content types, among other configurations. The communication links can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a cache node in a content delivery network comprising:
   identifying a content request without a valid token for content not cached on the cache node;
   in response to the content request, generating a synthetic response for the content request, wherein the synthetic response includes at least a request for a proof of work and fingerprinting attributes associated with an end user device that generated the content request, wherein the request for a proof of work comprises a problem to be solved by the end user device;
   communicating the synthetic response to the end user device;
   obtaining a response from the end user device to the synthetic response;
   determining that the content request is associated with a bot based on the response;
   in response to determining that the content request is associated with a bot, preventing a second content request to an origin server to obtain the content;
   identifying a second content request without a valid token for second content not cached on the cache node;
   in response to the second content request, generating a second synthetic response for the content request, wherein the second synthetic response includes at least a request for a proof of work and fingerprinting attributes associated with a second end user device that generated the second content request;
   communicating the second synthetic response to the second end user device;
   obtaining a second response from the second end user device to the second synthetic response;
   determining that the second content request is not associated with a bot based on the response; and
   in response to determining that the second content request is not associated with a bot:
     obtaining the second content from an origin server; and
     providing the second content to the second end user device.

2. The method of claim 1, wherein the proof of work comprises a java script proof of work function.

3. The method of claim 1, wherein the fingerprinting attributes comprise a browser version, an IP address associated with the end user device, or an operating system version.

4. The method of claim 1, wherein determining that the content request is associated with a bot based on the response comprises:
   providing at least one of the fingerprinting attributes to at least one service,
   obtaining an indication from the at least one service that the end user device comprises a bot; and
   determining that the content request is associated with a bot based on the indication.

5. The method of claim 1, wherein determining that the content request is associated with a bot based on the response comprises:
   generating a score based on the fingerprinting attributes;
   determining that the content request is associated with a bot based on the score satisfying at least one criterion.

6. The method of claim 1 further comprising, in response to determining that the second content request is not associated with a bot:
   generating a token for the second end user device; and
   providing the token to the second end user device.

7. The method of claim 1 further comprising caching the second content in the cache node.

8. The method of claim 1 further comprising:
obtaining one or more bot preferences from a customer of the content delivery network, wherein the one or more bot preferences indicate at least at least one criterion associated with a bot;
generating a score based on the fingerprinting attributes;
determining that the content request is associated with a bot based on the score satisfying the at least one criterion.

9. A computing apparatus comprising:
a storage system;
a processing system operatively coupled to the storage system; and
program instructions stored on the storage system to provide bot detection in a content delivery network that, when executed by the processing system, direct the processing system to:
identify a content request without a valid token for content not cached on the cache node;
in response to the content request, generate a synthetic response for the content request, wherein the synthetic response includes at least a request for a proof of work and fingerprinting attributes associated with an end user device that generated the content request, wherein the request for a proof of work comprises a problem to be solved by the end user device;
communicate the synthetic response to the end user device;
obtain a response from the end user device to the synthetic response;
determine that the content request is associated with a bot based on the response;
in response to determining that the content request is associated with a bot, prevent a second content request to an origin server to obtain the content;
identify a second content request without a valid token for second content not cached on the cache node;
in response to the second content request, generate a second synthetic response for the content request, wherein the second synthetic response includes at least a request for a proof of work and fingerprinting attributes associated with a second end user device that generated the second content request;
obtain a second response from the second end user device to the second synthetic response;
determine that the second content request is not associated with a bot based on the response; and
in response to determining that the second content request is not associated with a bot:
obtain the second content from an origin server; and
provide the second content to the second end user device.

10. The computing apparatus of claim 9, wherein the proof of work comprises a java script proof of work function.

11. The computing apparatus of claim 9, wherein the fingerprinting attributes comprise a browser version, an IP address associated with the end user device, or an operating system version.

12. The computing apparatus of claim 9, wherein determining that the content request is associated with a bot based on the response comprises:
providing at least one of the fingerprinting attributes to at least one service,
obtaining an indication from the at least one service that the end user device comprises a bot; and
determining that the content request is associated with a bot based on the indication.

13. The computing apparatus of claim 9, wherein determining that the content request is associated with a bot based on the response comprises:
generating a score based on the fingerprinting attributes;
determining that the content request is associated with a bot based on the score satisfying at least one criterion.

14. The computing apparatus of claim 9, wherein the program instructions further direct the processing system to, in response to determining that the second content request is not associated with a bot:
generate a token for the second end user device; and
provide the token to the second end user device.

15. The computing apparatus of claim 9, wherein the program instructions further direct the processing system to cache the second content in the cache node.

16. The computing apparatus of claim 9, wherein the program instructions further direct the processing system to:
obtain one or more bot preferences from a customer of the content delivery network, wherein the one or more bot preferences indicate at least at least one criterion associated with a bot;
generate a score based on the fingerprinting attributes;
determine that the content request is associated with a bot based on the score satisfying the at least one criterion.

17. A method comprising:
identifying a content request without a valid token for content not cached on the cache node;
in response to the content request, generating a synthetic response for the content request, wherein the synthetic response includes at least a request for a proof of work and fingerprinting attributes associated with an end user device that generated the content request, wherein the request for a proof of work comprises a problem to be solved by the end user device;
obtaining a response from the end user device to the synthetic response;
determining whether the response satisfies at least one criterion defined by a customer of the content delivery network to indicate a bot;
when the response satisfies the at least one criterion, preventing a second content request to an origin server to obtain the content; and
when the response fails to satisfy the at least one criterion:
obtaining the content from an origin server; and
providing the content to the end user device.

18. The method of claim 17 further comprising:
when the response fails to satisfy the at least one criterion:
generating a token for the end user device; and
providing the token to the end user device.

* * * * *